(12) United States Patent
Verzulli (10) Patent No.: US 6,344,817 B1
(45) Date of Patent: Feb. 5, 2002

(54) METHOD OF DISPLAYING MANUFACTURER/MODEL CODE AND PROGRAMMABLE UNIVERSAL REMOTE CONTROL EMPLOYING SAME

(75) Inventor: Christopher J. Verzulli, Setauket, NY (US)

(73) Assignee: U.S. Electronics Components Corp., Port Jefferson, NY (US)

( * ) Notice: Subject to any disclaimer, the term of this patent is extended or adjusted under 35 U.S.C. 154(b) by 0 days.

(21) Appl. No.: 09/572,687

(22) Filed: May 16, 2000

Related U.S. Application Data
(60) Provisional application No. 60/134,555, filed on May 17, 1999.

(51) Int. Cl.[7] .................................................. G08C 19/12
(52) U.S. Cl. .................. 341/176; 348/162; 340/825.69; 340/825.72; 341/173
(58) Field of Search ................................. 341/173, 176; 340/825.72, 825.57, 825.69, 825.37; 348/162, 163, 164

(56) References Cited

U.S. PATENT DOCUMENTS

| | | | |
|---|---|---|---|
| 4,626,848 A | 12/1986 | Ehlers | .................... 340/825.69 |
| 4,703,359 A | 10/1987 | Rumbolt et al. | ............. 348/734 |
| 4,774,511 A | 9/1988 | Rumbolt et al. | ........ 340/825.69 |
| 4,866,434 A | 9/1989 | Keenan | ................... 340/825.72 |
| 5,515,052 A | 5/1996 | Darbee | ......................... 341/176 |
| 5,614,906 A | 3/1997 | Hayes et al. | ................. 341/176 |

OTHER PUBLICATIONS

International Search Report–Prepared for Corresponding International Application No. PCT/US00/13542.

*Primary Examiner*—Michael Horabik
*Assistant Examiner*—Albert K. Wong
(74) *Attorney, Agent, or Firm*—Hoffmann & Baron, LLP

(57) ABSTRACT

A programmable, universal remote control for controlling many different of remote controlled devices, such as televisions, videocassette recorders, and cable boxes is provided. The remote control can be programmed with a code corresponding to a particular manufacturer and model of the remote controlled device to be controlled. The remote control can also display this code on the remote controlled device using preexisting circuitry in the remote control. If the user does not know the particular manufacturer/model code corresponding to the remote controlled device to be controlled, he may sequence through the available manufacturer/model codes in the remote control until an appropriate code is found. Methods are also provided for programming, displaying, and searching for the appropriate manufacturer/model code in the remote control.

8 Claims, 6 Drawing Sheets

FIG. 3

ROM ADDRESS

26

```
0000H   OFF-CODE 1
        ON-CODE 1
        1-CODE 1
        2-CODE 1
        3-CODE 1
          :
          :
0FFFH
1000H   OFF-CODE 2
        ON-CODE 2
        1-CODE 2
        2-CODE 2
        3-CODE 2
          :
          :
1FFFH
2000H   OFF-CODE 3
        ON-CODE 3
        1-CODE 3
        2-CODE 3
        3-CODE 3
          :
          :
2FFFH
          o
          o
          o
```

} PROGRAM CODE SET 1

} PROGRAM CODE SET 2

} PROGRAM CODE SET 3

METHOD OF DISPLAYING MANUFACTURER/MODEL CODE AND PROGRAMMABLE UNIVERSAL REMOTE CONTROL EMPLOYING SAME

CROSS-REFERENCE TO RELATED APPLICATION

This application is based on Provisional Patent Application Serial No. 60/134,555 filed on May 17, 1999, the disclosure of which is incorporated herein by reference.

BACKGROUND OF THE INVENTION

This invention relates generally to a programmable, universal remote control, and more particularly to a programmable, universal remote control in which manufacturer and model numbers of electronic devices to be controlled are stored in the remote control.

Originally, standard remote controls were provided for use with a specific electronic apparatus to be controlled. Typically the standard remote control uses infrared signals to control the operation of electronic devices such as televisions, audio equipment, videocassette recorders, and the like. The appropriate infrared signal is associated with a particular button or sequence of buttons on a keypad of the remote control. By depressing the button or buttons on the remote control, the user causes the remote control to transmit the corresponding infrared signal. The electronic device receives the infrared signal, processes its content, and performs a function associated with the infrared signal.

However, remote controls of this type have many drawbacks. First, since each electronic device requires its own remote control, the user must keep track of a multitude of remote controls, which can become very cumbersome. In addition, the user must recall which remote control operates which electronic device or be forced to try multiple remote controls until the correct one is found.

In addition, as the user replaces old electronic apparatus with newer, more up to-date models, the remote control provided with the old equipment can no longer be used to control the new equipment. For instance, if the user owns a particular television with having a dedicated remote control, upon the purchase of a new television, the old remote control would be useless since it would likely not be able to control the new television. Further, the new television would require yet another remote control, which would not reduce the total number of remote controls required by the user. Therefore, a single, universal remote control that can control many different devices and that can be programmed to control additional and/or new electronic devices is desirable.

Programmable, universal remote controls have been developed that solve these deficiencies. These remote controls may be programmed with codes associated with a particular manufacturer and model number of the electronic apparatus to be controlled. In addition, each of the different codes is stored within the same remote control, which enables the user to control multiple electronic devices with one remote control.

Universal remote controls originally required the user to "teach", or the remote control to "learn", the proper codes to transmit in response to depressing a particular button on the remote control. A learning mode was initiated by selecting a predetermined sequence of buttons. A button on the universal remote control was then depressed, and a button on the standard remote control originally provided to control the electronic apparatus was depressed. The signal transmitted by the standard remote control was received by the universal remote control, associated with the button depressed on the universal remote control, and stored for subsequent use by the universal remote control. Thus, the universal remote control learned the appropriate signal to transmit in response to depressing a particular button. In this manner, each of the buttons on the standard remote control could be implemented by the universal remote control.

Universal remote controls often allocate different sections of the keypad for use in controlling different devices. Alternatively, a device selection button may be provided, which enables the user to selectively control multiple types of electronic devices, such as a televisions, videocassette recorders, and stereo receivers. The learning mode described above is used to program the appropriate commands required to control each of the desired electronic devices.

While universal remote controls have been satisfactory, they suffer from many shortcomings. For instance, they require that the user teach the universal remote control each of the codes necessary to control each of the electronic devices. Since any particular electronic apparatus may require several codes, and the user may own many electronic devices, programming the universal remote control becomes a burden. In addition, these codes are typically stored in random access memory (RAM), which requires that power be maintained to retain its contents. Thus, when the batteries are changed, or their power has been consumed, the contents of RAM are lost, and the user must reprogram the universal remote control.

In order to solve some of these deficiencies, programmable, universal remote controls have been developed with electrically erasable, programmable, read-only memory (EEPROM), which maintains its contents without power. Thus, when the codes are learned by the universal remote control, they are maintained in EEPROM indefinitely. However, in order to retain all of the programming codes required to control a multitude of electronic devices, it becomes necessary to provide a relatively large amount of EEPROM. Since EEPROM is expensive and relatively slow, this greatly increases the cost of the remote control and likely decreases its speed of operation.

As a further improvement programmable, universal remote controls now use a manufacturer/model code, which provides an index to one of a plurality of complete sets of programming codes necessary to control a particular manufacturer and model number of remote controlled device. The user finds the specific manufacturer and model number of his device in a cross-reference table stored in inexpensive, programmable, read-only memory (PROM). The user then programs this manufacturer/model code into the universal remote control, which will thereafter transmit the correct set of programming codes required to control his electronic device. In this way, programming codes for a wide variety of manufacturers and model numbers can be stored within the universal remote control in a relatively inexpensive manner.

For example, the universal remote control could contain a first set of program codes for operating a particular television, a second set of program codes for operating a particular videocassette recorder (VCR), a third set of program codes for operating a second type of television, a fourth set of program codes for operating a second type of VCR, and so forth. Thus, for the user to invoke a certain set of codes to control a particular device, the user only needs to teach the universal remote control the manufacturer/model code corresponding to the electronic device the user wishes to control, and not the complete set of program codes required to control the electronic device.

There are a number of situations in which the user is required to determine the manufacturer/model code that has been programmed into the remote control. Since the majority of universal remote controls do not have a display, some have overcome this problem by using a blinking, light emitting diode (LED). For multi-digit manufacturer/model codes, the LEI) blinks a specific number of times corresponding to the first digit, then pauses, and blinks a specific number of times corresponding to the second number, then pauses, and so forth. Such a display mechanism can be burdensome for the user who must count the number of blinks and record the count for each digit.

SUMMARY OF THE INVENTION

In accordance with the present invention, a method of programming a remote control is provided which includes the steps of initializing a remote controlled device in a first state (such as on) and initiating a program mode in the remote control. A first program code is transmitted by the remote control, and the program mode is terminated if the remote controlled device changes to a second state, such as off, in response to receiving the first program code. Thereafter, a first set of program codes is accessed using a first device code. However, if the remote controlled device remains in the first state in response to receiving the first program code, a second program code is transmitted, and so on, until the appropriate program code is found.

The first device code indicates the type of remote controlled device if the remote controlled device is in the second state in response to receiving the first program code.

In further accordance with the present invention a method of displaying a device code on a remote controlled device is provided, which includes the steps of initiating a display mode in a remote control, retrieving a device code stored in the remote control, transmitting a program code, and changing the remote controlled device to a first state in response to receiving the program code. The device code indicates the type of remote controlled device, and the program code is representative of the device code. The first state is representative of the device code, such as a particular channel on a television, and indicates the device code to a user.

In still further accordance with the present invention a remote control having a program mode is provided, which includes a processing circuit, a transmitter, and a memory device. The transmitter transmits the first program code in response to the remote control being in the program mode, and the program mode terminates if the remote controlled device changes to the second state in response to receiving the first program code. The transmitter transmits the second program code if the remote controlled device remains in the first state in response to receiving the first program code, and so on until the correct program code is found. The first device code is used to access the first set of program codes if the remote controlled device is in the second state in response to receiving the first program code. The first device code indicates the type of remote controlled device if the remote controlled device changes to the second state in response to receiving the first program code.

In yet further accordance with the present invention a remote control having a display mode is provided, which includes a processing circuit, a memory device, and a transmitter. A device code is stored in the memory device, and the processing circuit retrieves the device code in response to the remote control being in the display mode. The processing circuit generates a program code representative of the device code, and the transmitter transmits the program code to the remote controlled device. The remote controlled device is in a first state, such as a particular channel on a television, in response to receiving the program code, and the first state is indicative of the device code to a user.

As a result of the present invention, a programmable, universal remote control, is provided, which is able to control many different electronic devices, such as televisions, VCRs, stereo systems, cable boxes, and the like. In addition, the programmable, universal remote control allows a user to program manufacturer/model codes, which define a particular electronic device to be controlled, into the remote control. Further, the programmable, universal remote control enables the user to display a current manufacturer/model code, which is already programmed into the remote control, on a remote controlled device. Yet further, the programmable, universal remote control can find the correct manufacturer/model code corresponding to a particular remote controlled device, and program that manufacturer/model code into the remote control.

These and other objects, features and advantages of the present invention, will become apparent from the following detailed description of illustrative embodiments thereof, which is to be read in connection with the accompanying drawings.

DETAILED DESCRIPTION OF THE PREFERRED EMBODIMENTS

Figure 1A:
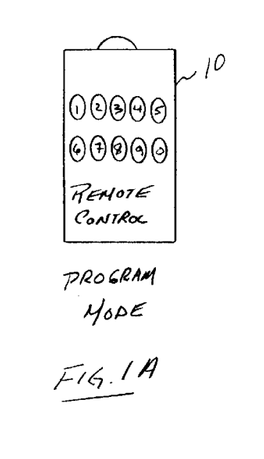
FIGS. 1A and 1B are pictorial representations of a programmable, universal remote control formed in accordance with the present invention in a program mode and a display mode, respectively.

FIG. 1A shows a programmable, universal remote control 10 formed in accordance with the present invention. The remote control 10 is initially programmed with a device code, which identifies the particular remote controlled device such as a manufacturer/model code, while in a program mode. Preferably, the user is provided with a cross-reference table listing a wide variety of manufacturers or brands and model numbers of remote controlled devices along with the corresponding manufacturer/model code in a user's manual.

The user will first look up the specific manufacturer and model number of his remote controlled device and then program the corresponding manufacturer/model code into the remote control 10. The remote controlled device can be a television, a videocassette recorder (VCR), a stereo system, a cable box, and the like. The user preferably initiates the program mode by entering a program sequence on a keypad of the remote control 10. The user then enters the desired manufacturer/model code to be programmed into the remote control 10.

Figure 1B:
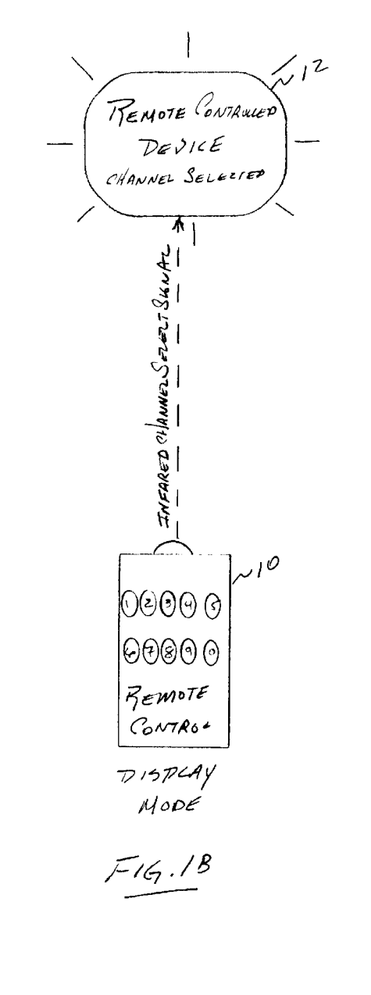

FIG. 1B shows the remote control 10 during a display mode. The user enters a display sequence on the keypad of the remote control 10, which initiates the display mode and causes the remote control 10 to transmit a program code or infrared (IR) channel select signal to the remote controlled device 12. The IR channel select signal transmitted during the display mode from the remote control 10 causes the remote controlled device to change to a channel corresponding to the manufacturer/model (M/M) code that was programmed into the remote control 10 during the program mode. The user then interprets the channel displayed on the remote controlled device as representing the current M/M code programmed into the remote control 10. In this way, the remote control 10 uses pre-existing digital, analog and infrared circuitry to display the M/M code programmed into the remote control 10.

Figure 2A:
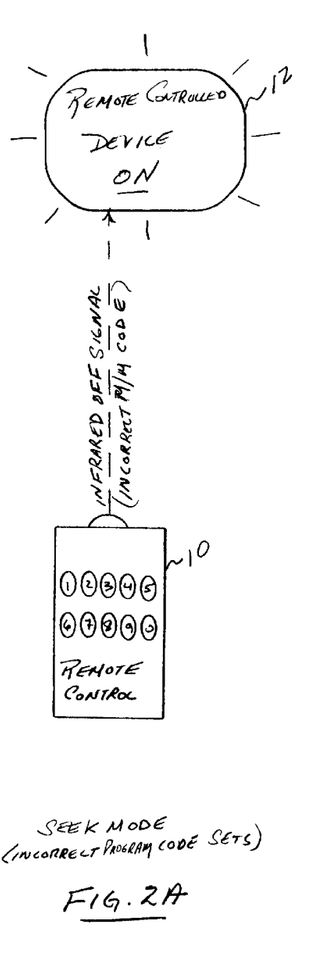
FIGS. 2A and 2B are pictorial representations of a programmable, universal remote control in a seek mode during which incorrect programmed code sets and a correct program code set, respectfully, are selected in accordance with the present invention.
Figure 2B:
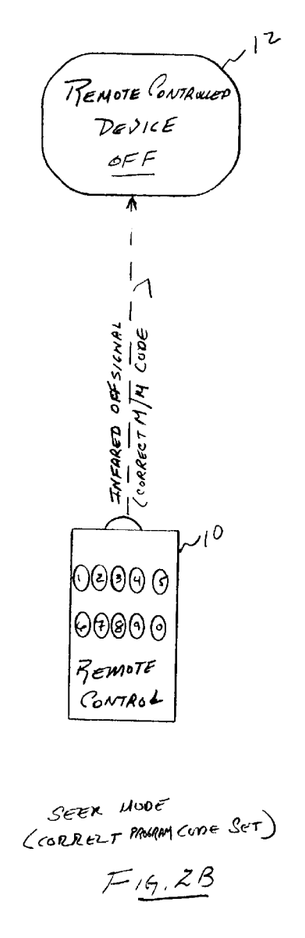

FIGS. 2A and 2B show the remote control 10 during a seek mode. Prior to entering the seek mode, the user preferably turns the remote controlled device 12 on. The user then enters a seek-start sequence on the keypad of the remote control 10, which causes the remote control 10 to enter the seek mode and sequentially transmit program codes corresponding to the off-command or off-signals corresponding to each of the M/M codes contained in the remote control 10. FIG. 2A shows that the remote controlled device 12 does not respond to infrared off-signals that do not correspond to the correct M/M code for that particular remote controlled device 12, and therefore the remote controlled device 12 will stay on. FIG. 2B shows that the remote controlled device 12 does respond to the infrared off-signal corresponding to the correct M/M code by turning off. The user enters a seek-stop sequence on the keypad to terminate the seek mode and store the current M/M code found to be appropriate for controlling the remote controlled device 12 in the remote control 10

The program, display, seek-start and seek-stop sequences entered by the user are preferably abnormal sequences of keys not typically encountered during normal operation of the remote control, dedicated keys, or any other action performed by the user to initiate these modes.

Figure 3:
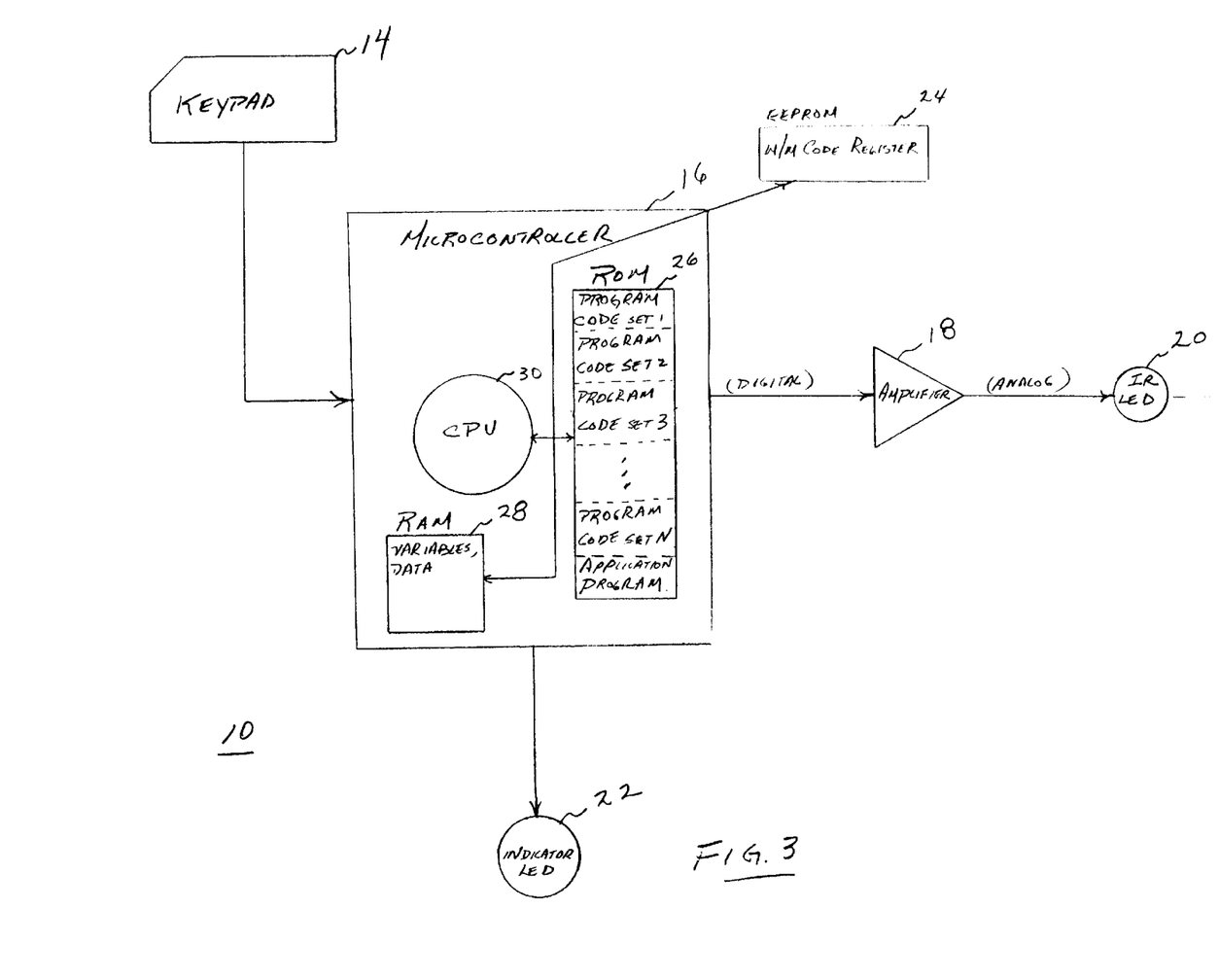
FIG. 3 is a block diagram of a programmable, universal remote control formed in accordance with the present invention.

FIG. 3 is a block diagram of the programmable, universal remote control 10, which includes the keypad 14; a processing circuit, microprocessor, application specific integrated circuit (ASIC), programmable logic device, or microcontroller 16; an amplifier 18; an infrared (IR) light emitting diode (LED); electrically-erasable, programmable, read-only memory (EEPROM) 24; and an indicator LED 22. The microcontroller 16 preferably includes read-only memory (ROM) 26, random-access memory (RAM) 28, and a central processing unit (CPU) 30.

The CPU 30 preferably executes an operational program residing in the ROM 26. The ROM 26 also contains a program code set corresponding to each M/M code. The EEPROM 24 provides storage which may be modified by the CPU 30, but which is retained even after power, such as batteries, is removed. The EEPROM preferably contains the M/M code used to indicate the set of program codes that must be used to control a specific remote controlled device. The RAM 32 preferably stores data and variables that may be modified by the CPU 30, but which are lost when power is removed.

Figure 4:
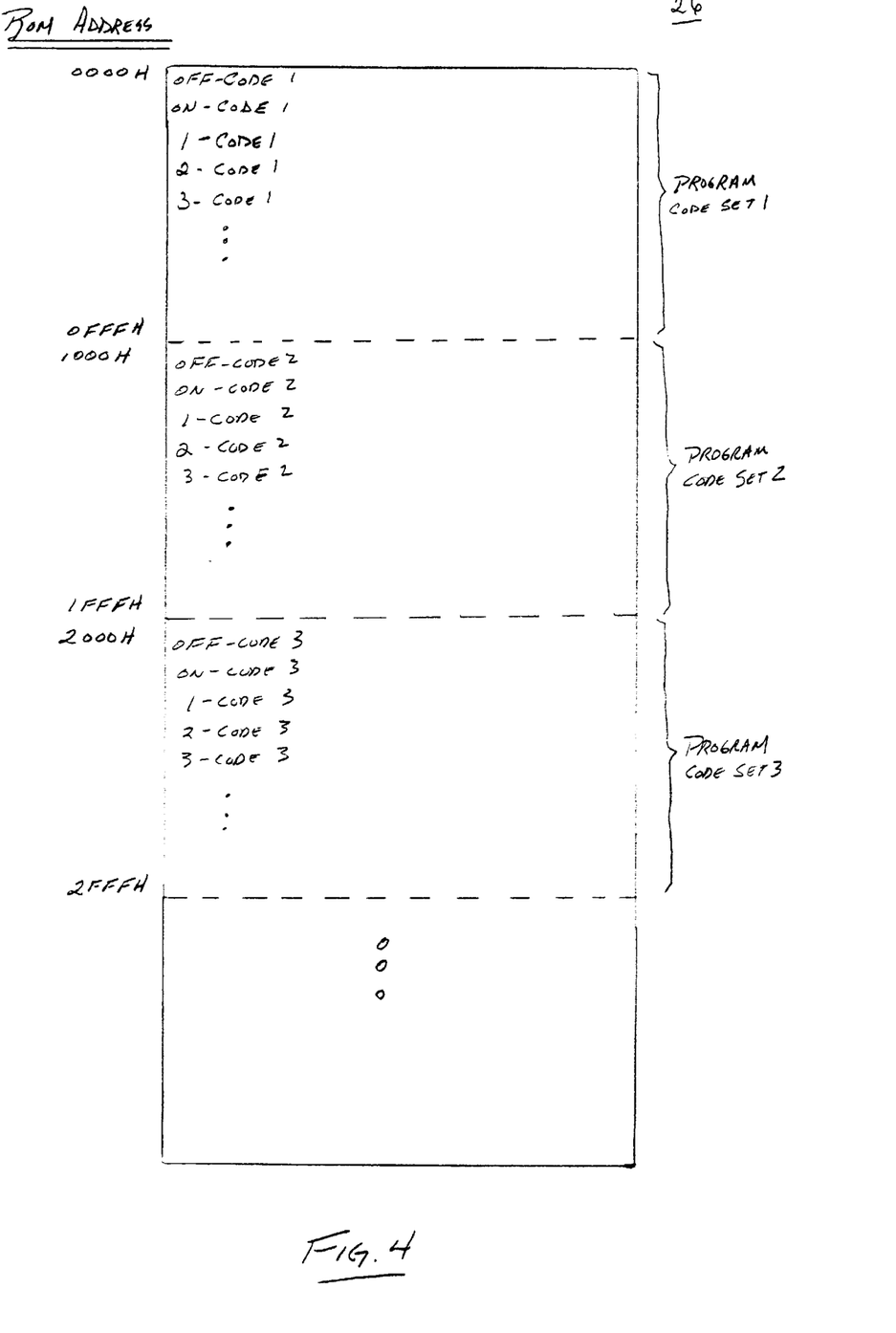
FIG. 4 is a pictorial representation of the contents of a read-only memory (ROM) of a programmable, universal remote control formed in accordance with the present invention.

FIG. 4 shows a more detailed representation of the contents of the ROM 26. Each manufacturer and model number of remote controlled device controllable by the remote control 10 is represented by a different M/M code. Each M/M code corresponds to a different program code set stored in the ROM 26. Each program code set contains various program codes required to control the remote controlled device corresponding to the particular M/M code associated with the program code set. The program codes include codes, such as an off-code, an on-code, a one-code, a two-code, a three-code, and so forth, corresponding to different buttons on the remote control. The program code sets are preferably stored sequentially within blocks corresponding to a particular M/M code, as shown in FIG. 4.

Referring again to FIG. 3, the user selects a particular channel on the keypad 14 during normal operation, and the CPU 30 uses the contents of the M/M code register in EEPROM 24 to access the correct program code set in ROM 26 corresponding to the current M/M code. The CPU 30 then retrieves the program code associated with the channel selected from the appropriate program code set. The program code is then output to the amplifier 18, which preferably includes transistors, resistors, and other electronic components well known in the art. The amplifier 18 translates the digital output of the microcontroller 16 such that its electrical characteristics are compatible with the IR LED 20. The IR LED 20 then transmits the IR channel select signal, which represents the channel selected, in response to receiving the output of the amplifier 18. The remote controlled device 12 then receives the IR channel select signal and displays the selected channel.

The user initiates the program mode by entering the program sequence on the keypad 14. If the user knows which M/M code is appropriate for his particular remote controlled device 12, the user enters that M/M code on the keypad 14. The microcontroller 16 then stores the entered M/M code into the EEPROM 24 if it is valid.

The user initiates the display mode by entering the display sequence on the keypad 14. The microcontroller 16 then retrieves the current M/M code from the EEPROM 24, and uses it to access the program code set in ROM 26 corresponding to the current M/M code. The CPU 30 determines the appropriate program code that represents the current M/M code and provides that program code to the amplifier 18. The output of the amplifier 18 is provided as the contents of the IR channel select signal via the IR LED 20 to the remote controlled device 12. The remote controlled device 12 then displays the channel selected, which represents the current value of the M/M code.

Prior to initiating the seek mode, the user preferably turns the remote controlled device 12 on and then enters a seek-start sequence on the keypad 14. The CPU 30 then preferably loads the EEPROM 24 with the M/M code corresponding to program code set 1 and outputs the off-code corresponding to program code set 1. If the remote controlled device 12 is turned off, then the M/M code is retained in the M/M code register 24 as the correct M/M code for the particular remote controlled device 12 following entry of the seek-stop sequence by the user.

However, if the remote controlled device 12 was not turned off, the CPU 30 loads the EEPROM 24 with the M/M code corresponding to the next program code set following a delay required for the remote controlled device 12 to respond. The remote control 10 then transmits the off-code for the next program code set, and the process repeats until the remote controlled device 12 is turned off. The remote controlled device 12 is preferably turned on prior to initiating the seek mode since such devices typically turn off faster than they turn on. This decreases the delay required between off-code transmissions. This delay must account for the time required by the user to enter the seek-stop sequence in response to determining that the electronic device has successfully been turned off.

Figure 5:
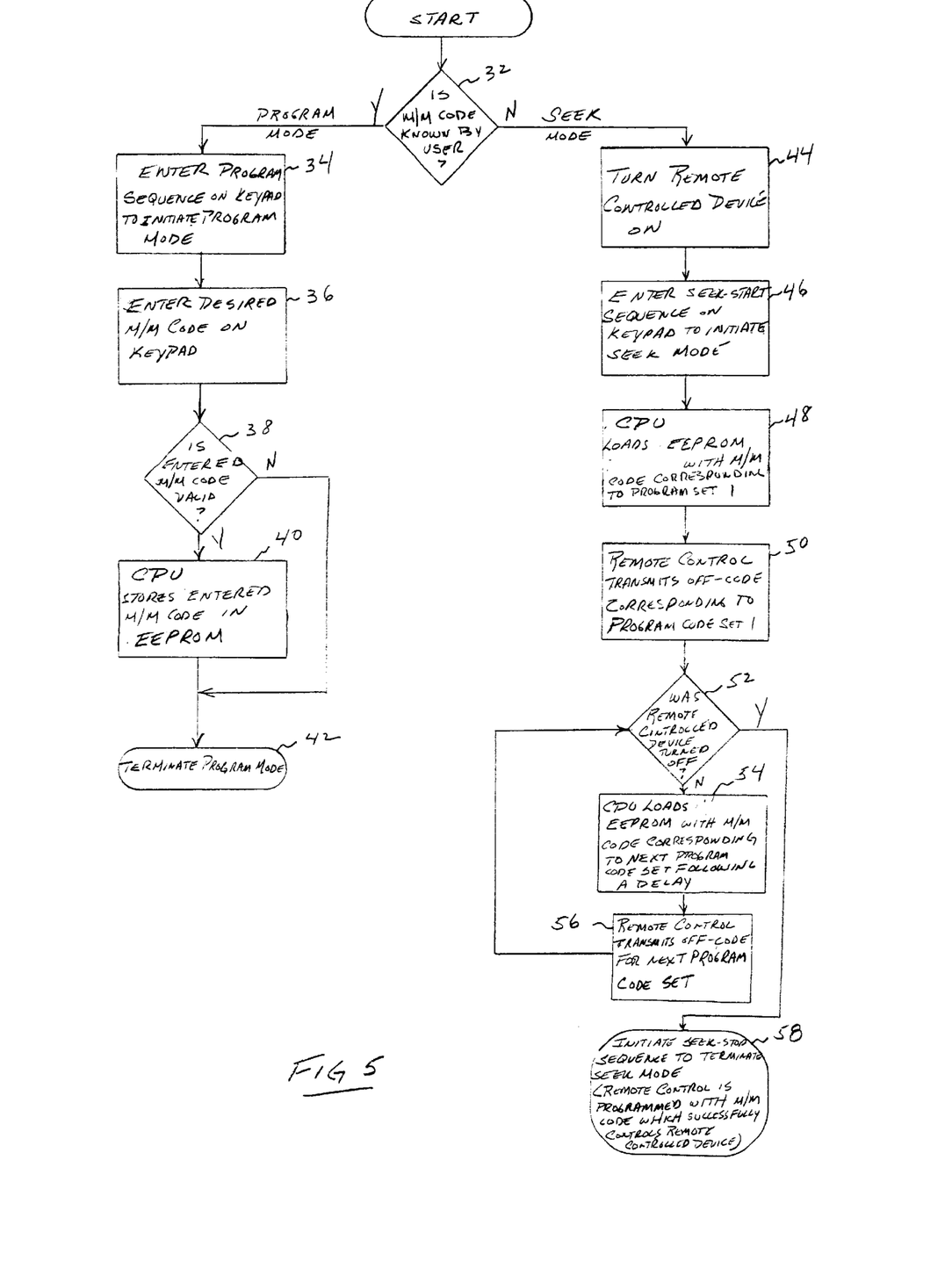
FIG. 5 is a flow chart of a program mode and a seek mode in accordance with a method of the present invention.

FIG. 5 is a flow chart showing the sequence of steps in the program mode and the seek mode. If the M/M code is known by the user in step 32, the user will enter the program sequence on the keypad, which initiates the program mode in step 34. The user will then enter the desired M/M code to be programmed into the remote control on the keypad in step 36, and if the entered sequence is valid in step 38, the CPU will store that M/M code in the EEPROM in step 40. The program mode terminates in step 42. If the entered M/M code is not valid, then the program mode will terminate without storing the entered M/M code in the EEPROM.

If the M/M code is not known by the user in step 32, then the user turns the remote controlled device on in step 44, and enters the seek-start sequence on the keypad in order to initiate the seek mode in step 46. The CPU will then preferably load the EEPROM with the M/M code corresponding to program set 1 in step 48, and the remote control will transmit an off-code corresponding to program code set 1 in step 50. If the remote controlled device is turned off in step 52 in response to the off-code transmitted in step 50, then the seek-stop sequence is entered by the user to terminate the seek mode, and the contents of the EEPROM represents the correct the M/M code that controls that specific remote controlled device.

However, if the remote controlled device was not turned off in step 52, the CPU will load the EEPROM with the M/M code corresponding to the next program code set following the delay in step 54. The delay is included to allow time for the remote controlled device to respond and the user to notice its response prior to transmission of the next off-code. Following the delay, the remote control transmits the off-code corresponding to the next program code set in step 56. This process repeats with step 52 until the remote controlled device is turned off, at which point the contents of the EEPROM correctly indicates the M/M code corresponding to the particular remote controlled device to be controlled.

Figure 6:
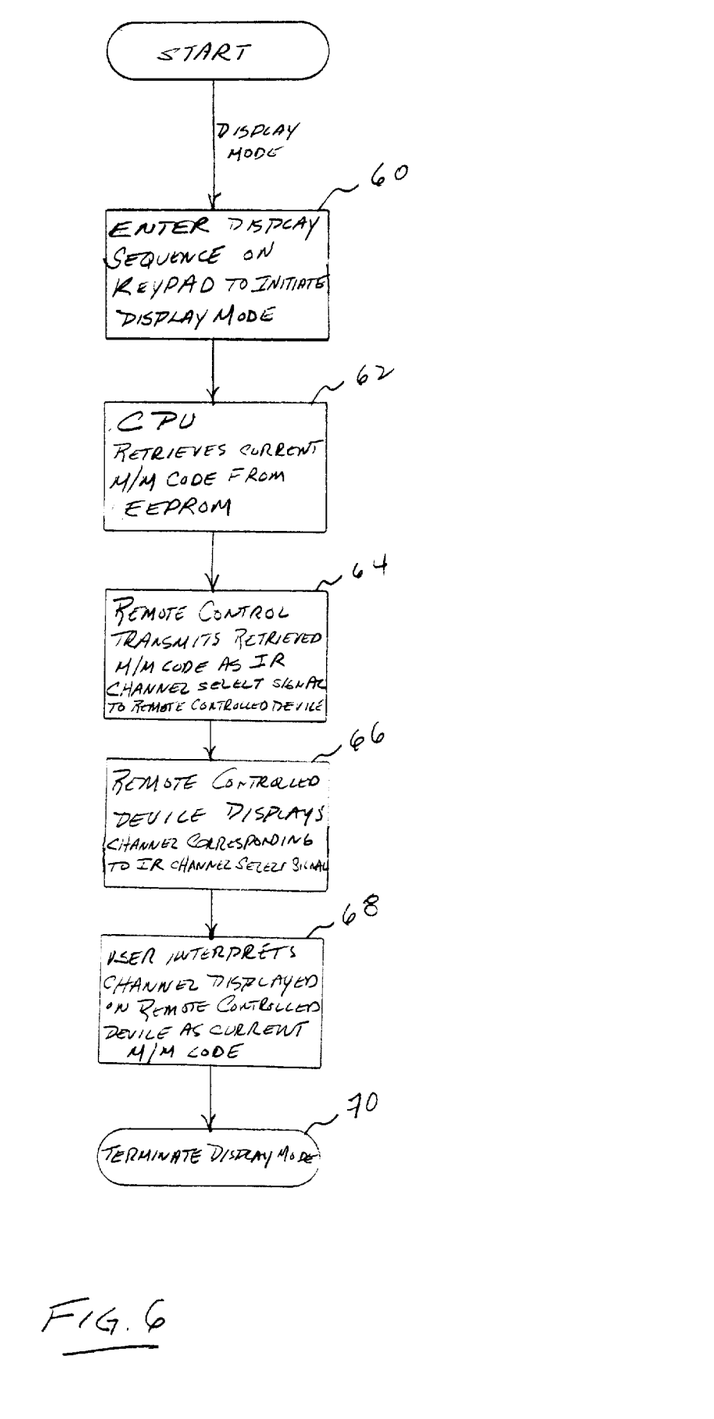
FIG. 6 is a flow chart of a display mode in accordance with a method of the present invention.

FIG. 6 shows the sequence of steps involved in the display mode. The user enters a display sequence on the keypad to initiate the display mode in step 60, and the CPU retrieves the current M/M code from the EEPROM in step 62. The remote control then transmits the M/M code retrieved from the EEPROM as the contents of the IR channel select signal to the remote controlled device in step 64, and the remote controlled device displays the channel corresponding to the IR channel select signal in step 66. The user interprets the channel displayed on the remote controlled device as representing the current value of the M/M code in step 68, and the display mode terminates in step 70.

From the foregoing description, it will be appreciated by those skilled in the art that a method and apparatus formed in accordance with the present invention can provide a programmable, universal remote control, which is able to control many different electronic devices, while enabling the user to program manufacturer/model codes into the remote control. It will also be appreciated that the method and apparatus formed in accordance with the present invention enables the display of the current manufacturer/model code programmed into the remote control on a remote controlled device. It is to be still further appreciated that the method and apparatus formed in accordance with the present invention provides a universal remote control, which can find the correct manufacturer/model code corresponding to a particular remote controlled device, and program that manufacturer/model code into the remote control.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method of displaying a device code on a remote controlled device, the device code being representative of the remote controlled device, the method comprising the steps of:

initiating a display mode in a remote control;

retrieving the device code, the device code being stored in the remote control;

transmitting a program code, the program code being transmitted from the remote control, the program code being representative of the device code; and changing the remote controlled device to a first state which is displayed in response to receiving the program code, the first state being representative of the device code, the first state being indicative of the device code to a user.

2. A method of displaying information representative of a manufacturer/model code on a remote controlled device as defined by claim 1, wherein the step of initiating the program mode includes the step of selecting at least one button on the remote control.

3. A remote control, the remote control having a display mode, the remote control comprising:

a processing circuit;

a memory device, the memory device being responsive to the processing circuit, the memory device having a device code stored therein, the device code being representative of a remote controlled device, the processing circuit retrieving the device code from the memory device in response to the remote control being in the display mode, the processing circuit generating a program code, the program code being representative of the device code; and a transmitter, the transmitter being responsive to the processing circuit, the transmitter transmitting the program code to the remote controlled device, the remote controlled device being in a first state which is displayed in response to receiving the program code, the first state being representative of the device code, the first state being indicative of the device code to a user.

4. A remote control as defined by claim 3, wherein the processing circuit includes at least one of a microcontroller, microprocessor, application specific integrated circuit (ASIC), and programmable logic device.

5. A remote control as defined by claim 3, wherein the remote controlled device is a television, the television being able to be tuned to at least one of a plurality of channels, the first state being representative of at least one of the plurality of channels to which the television is tuned.

6. A remote control as defined by claim 3, further including at least one button, wherein the display mode is initiated by selecting the at least one button.

7. A remote control as defined by claim 3, further including at least one button, wherein the program mode is terminated by selecting the at least once button.

8. A remote control as defined by claim 3, wherein the transmitter includes an infrared (IR), light-emitting diode (LED).

\* \* \* \* \*

UNITED STATES PATENT AND TRADEMARK OFFICE
CERTIFICATE OF CORRECTION

PATENT NO.     : 6,344,817 B1
DATED          : February 5, 2002
INVENTOR(S)    : Christopher J. Verzulli It is certified that error appears in the above-identified patent and that said Letters Patent is hereby corrected as shown below:

Title page,
The title page showing the illustrative figure should be deleted to be replaced with the attached title page.

Drawings,
Sheets 1-6, consisting of Figs 1-6, should be deleted and substitute therefore the corrected sheets 1-6, as shown on the attached pages.

Column 3,
Line 9, now reads "codes, the LEI" should read -- codes, the LED --;
Line 39, now reads "to receiving the program code." should read -- to receiving the program code. --

Signed and Sealed this

Seventeenth Day of September, 2002

Attest:

Attesting Officer

JAMES E. ROGAN
Director of the United States Patent and Trademark Office (12) United States Patent
Verzulli (10) Patent No.: US 6,344,817 B1
(45) Date of Patent: Feb. 5, 2002

(54) METHOD OF DISPLAYING MANUFACTURER/MODEL CODE AND PROGRAMMABLE UNIVERSAL REMOTE CONTROL EMPLOYING SAME

(75) Inventor: Christopher J. Verzulli, Setauket, NY (US)

(73) Assignee: U.S. Electronics Components Corp., Port Jefferson, NY (US)

( * ) Notice: Subject to any disclaimer, the term of this patent is extended or adjusted under 35 U.S.C. 154(b) by 0 days.

(21) Appl. No.: 09/572,687

(22) Filed: May 16, 2000

Related U.S. Application Data

(60) Provisional application No. 60/134,555, filed on May 17, 1999.

(51) Int. Cl.[7] .............................................. G08C 19/12
(52) U.S. Cl. .................. 341/176; 348/162; 340/825.69; 340/825.72; 341/173
(58) Field of Search .................. 341/173, 176; 340/825.72, 825.57, 825.69, 825.37; 348/162, 163, 164

(56) References Cited

U.S. PATENT DOCUMENTS

| | | | |
|---|---|---|---|
| 4,626,848 A | 12/1986 | Ehlers | 340/825.69 |
| 4,703,359 A | 10/1987 | Rumbolt et al. | 348/734 |
| 4,774,511 A | 9/1988 | Rumbolt et al. | 340/825.69 |
| 4,866,434 A | 9/1989 | Keenan | 340/825.72 |
| 5,515,052 A | 5/1996 | Darbee | 341/176 |
| 5,614,906 A | 3/1997 | Hayes et al. | 341/176 |

OTHER PUBLICATIONS

International Search Report–Prepared for Corresponding International Application No. PCT/US00/13542.

*Primary Examiner*—Michael Horabik
*Assistant Examiner*—Albert K. Wong
(74) *Attorney, Agent, or Firm*—Hoffmann & Baron, LLP (57) ABSTRACT

A programmable, universal remote control for controlling many different of remote controlled devices, such as televisions, videocassette recorders, and cable boxes is provided. The remote control can be programmed with a code corresponding to a particular manufacturer and model of the remote controlled device to be controlled. The remote control can also display this code on the remote controlled device using preexisting circuitry in the remote control. If the user does not know the particular manufacturer/model code corresponding to the remote controlled device to be controlled, he may sequence through the available manufacturer/model codes in the remote control until an appropriate code is found. Methods are also provided for programming, displaying, and searching for the appropriate manufacturer/model code in the remote control.

8 Claims, 6 Drawing Sheets